(12) United States Patent
Planche (10) Patent No.: US 9,867,439 B2
(45) Date of Patent: *Jan. 16, 2018

(54) SWITCHABLE DÉCOR

(71) Applicant: Swaponz, Inc., Natick, MA (US)

(72) Inventor: Patrick Planche, Natick, MA (US)

(73) Assignee: SWAPONZ, INC., Natick, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/351,613

(22) Filed: Nov. 15, 2016

(65) Prior Publication Data

US 2017/0055661 A1     Mar. 2, 2017

Related U.S. Application Data

(63) Continuation-in-part of application No. 14/920,198, filed on Oct. 22, 2015, now Pat. No. 9,510,656, which
(Continued)

(51) Int. Cl.
*A45C 11/00* (2006.01)
*B32B 7/12* (2006.01)
(Continued)

(52) U.S. Cl.
CPC .......... *A45C 11/00* (2013.01); *B29C 63/0013* (2013.01); *B32B 1/00* (2013.01); *B32B 3/266* (2013.01); *B32B 5/02* (2013.01); *B32B 7/02* (2013.01); *B32B 7/06* (2013.01); *B32B 7/12* (2013.01); *B32B 9/025* (2013.01);
(Continued)

(58) Field of Classification Search
CPC .. B32B 7/06; B32B 7/12; B32B 37/12; B32B 2250/40; B32B 2405/00; B32B 2451/00; B32B 2307/748; B44C 1/105; B44C 1/18; B29C 63/0013; B29L 2031/3437; Y10T 428/14; Y10T 428/1486; C09J 7/00;
(Continued)

(56) References Cited

U.S. PATENT DOCUMENTS 5,248,536 A    9/1993  Du Katz
5,458,930 A   10/1995  Brown
(Continued)

FOREIGN PATENT DOCUMENTS

CN       203492984     3/2014
WO       1998/017088   4/2008

*Primary Examiner* — Patricia L Nordmeyer
(74) *Attorney, Agent, or Firm* — Occhiuti & Rohlicek LLP (57) ABSTRACT n apparatus comprising a case, a first fixation sheet having a first side configured to be attached to the case and including a first permanent bonding agent with a first adhesion characteristic as well a second side having a first repositionable material with a second adhesion characteristic, the second adhesion characteristic being less permanent than the first adhesion characteristic. The apparatus also includes a third side configured to be attached to the second side of the first fixation sheet; and a second fixation sheet having fifth and sixth sides, the fifth side configured to be attached to a fourth side of the decorative sheet, the fifth side including a second bonding agent with a third adhesion characteristic; the sixth side having a second repositionable material with a fourth adhesion characteristic, the fourth adhesion characteristic being less permanent than the first and third adhesion characteristics.

20 Claims, 7 Drawing Sheets

Related U.S. Application Data is a continuation of application No. 13/832,903, filed on Mar. 15, 2013, now Pat. No. 9,199,432.

(51) Int. Cl.

| | |
|---|---|
| *A45F 5/00* | (2006.01) |
| *B32B 7/06* | (2006.01) |
| *B44C 1/10* | (2006.01) |
| *B29C 63/00* | (2006.01) |
| *H04B 1/3888* | (2015.01) |
| *B32B 5/02* | (2006.01) |
| *B32B 7/02* | (2006.01) |
| *B32B 9/02* | (2006.01) |
| *B32B 27/06* | (2006.01) |
| *B32B 1/00* | (2006.01) |
| *B32B 3/26* | (2006.01) |
| *B29L 31/34* | (2006.01) |

(52) U.S. Cl.
CPC .............. *B32B 27/06* (2013.01); *B44C 1/10* (2013.01); *H04B 1/3888* (2013.01); *A45C 2011/002* (2013.01); *A45C 2011/003* (2013.01); *B29L 2031/3437* (2013.01); *B32B 2250/40* (2013.01); *B32B 2307/402* (2013.01); *B32B 2307/732* (2013.01); *B32B 2307/748* (2013.01); *B32B 2307/75* (2013.01); *B32B 2405/00* (2013.01); *B32B 2439/00* (2013.01); *B32B 2451/00* (2013.01); *B32B 2571/00* (2013.01); *Y10T 428/1486* (2015.01)

(58) Field of Classification Search
CPC  C09J 2250/40; C09J 2405/00; C09J 2451/00; C09J 2031/3437; C09J 2307/748
See application file for complete search history.

(56) References Cited

U.S. PATENT DOCUMENTS

| | | | |
|---|---|---|---|
| 5,620,764 | A | 4/1997 | Schwarz |
| 6,482,288 | B1 | 11/2002 | Kreckel |
| 9,199,432 | B2 | 12/2015 | Planche |
| 9,510,656 | B2 * | 12/2016 | Planche .................. B32B 7/06 |
| 2001/0006714 | A1 | 7/2001 | Bull et al. |
| 2002/0066527 | A1 | 6/2002 | Lee |
| 2002/0090509 | A1 | 7/2002 | Hsu et al. |
| 2005/0279817 | A1 | 12/2005 | Susan |
| 2010/0288405 | A1 | 11/2010 | Hsu |
| 2011/0192857 | A1 | 8/2011 | Rothbaum et al. |
| 2011/0244230 | A1 | 10/2011 | Tsubaki et al. |
| 2012/0275130 | A1 | 11/2012 | Hsu et al. |
| 2013/0316115 | A1 | 11/2013 | Smith et al. |
| 2014/0272233 | A1 | 9/2014 | Downs |
| 2015/0111623 | A1 | 4/2015 | Hegemier et al. |

* cited by examiner

SWITCHABLE DÉCOR

CROSS REFERENCE TO RELATED APPLICATION

This application is a continuation-in-part of U.S. application Ser. No. 14/920,198 filed on Oct. 22, 2015, which is a continuation of U.S. application Ser. No. 13/832,903, filed on Mar. 15, 2013, issued as U.S. Pat. No. 9,199,432 on Dec. 1, 2015, the contents of both which are hereby incorporated by reference in their entirety.

BACKGROUND

This invention relates to covers that are attached to devices, for example, to protect or decorate devices, such as portable electronic devices.

Many consumer products, particularly portable devices or equipment, are desirably customized to allow the owner to more easily distinguish their device from other devices thereby facilitating identification and personalization of his/her device. For example, a wide variety of cases and "skins" (i.e., thin sticker with adhesive) are available for covering cell phones, smartphones, laptop computers and tablet computers. These cases also allow owners to personalize their equipment and express themselves.

When the cover becomes worn or when the owner of the device grows tired of the image or graphical design on the device, the cover is replaced or in the case of a skin, stripped from the housing of the device.

SUMMARY

In a general aspect of the invention, an apparatus comprises a case for receiving a removable article, the case having an outer surface and a first fixation sheet member. The first fixation sheet member has a first side and a second side, opposite the first side, the first side configured to be attached to the outer surface of the case, the first side including a first permanent bonding agent with a first adhesion characteristic, the second side having a first repositionable material with a second adhesion characteristic the second adhesion characteristic being less permanent than the first adhesion characteristic. The apparatus further includes a decorative sheet member having a third side and a fourth side, opposite the third side, the third side configured to be attached to the second side of the first fixation sheet. The apparatus also includes a second fixation sheet member having a fifth side and a sixth side, opposite the fifth side, the fifth side configured to be attached to the fourth side of the decorative sheet member, the fifth side including a second bonding agent with a third adhesion characteristic; the sixth side having a second repositionable material with a fourth adhesion characteristic, the fourth adhesion characteristic being less permanent than the first and third adhesion characteristics.

Embodiments of these aspects of the invention may include one or more of the following features.

In one embodiment, the repositionable material is an adhesive including, for example, microspheres.

In another embodiment, the repositionable material is a non-adhesive. For example, the non-adhesive is in the form of a mechanism selected from the group consisting of static and magnetic mechanisms.

In certain embodiments, the apparatus further includes an attachable member having a seventh side and an eighth side, opposite the seventh side, the seventh side having repositionable material. The attachable member and the second fixation sheet are configured such that when the attachable member is removed from the seventh side of the second fixation sheet, the repositionable material remains on the seventh side of the second fixation sheet.

The attachable member sheet is formed of a first material, the second fixation sheet is formed of a second material and the repositionable material adheres more strongly to the second material than to the first material. The eighth side of the attachable member may include a photographic, graphical or textual image. The attachable member includes a pocket. The attachable member has a thickness a range between 6 mil (0.006 inch) and 30 mil (0.030 inch).

In certain embodiments, the first and second bonding agents are the same; in other embodiments, they are different. Similarly, in certain embodiments, the first adhesion characteristic and the third adhesion characteristic are the same, whereas in other embodiments they are different. Also, the second adhesion characteristic and the fourth adhesion characteristic may be the same or can be different. Further, the first and second repositionable materials can be the same or different.

In the above embodiments, all of the advantages afforded by the use of a first fixation sheet for receiving a decorative sheet are extended through the use of a second fixation sheet that is received on the decorative sheet and is configured to receive other objects. For example, a user can select a decorative sheet with a particular design to serve as a background palette for placing other substitutable objects including photographs or images. Furthermore, the user can continue to substitute the decorative sheet itself to provide a different background palette.

In particular embodiments, the second fixation sheet includes a plurality of fixation pieces, each fixation piece including the second bonding agent and repositionable material. In such embodiments, the apparatus can further comprise a plurality of attachable members, each corresponding to one of the plurality of fixation pieces. The plurality of fixation pieces can have a first thickness and another of the plurality of fixation pieces has a second thickness different than the first thickness. Furthermore, the plurality of attachment members can have a third thickness and another of the plurality of attachment members can have a fourth thickness different than the third thickness. In such an embodiment the sum of the first and third thickness can be substantially the same as the thickness of the second and fourth thickness.

An embodiment that is configured to have a plurality or multiple fixation pieces has the additional advantage of allowing certain articles to be removed and replaced with other articles while allowing some articles to remain.

In certain embodiments, the case is configured to receive a portable communications device, such as a phone, PDA, notebook, MP3 player or laptop computer. In other embodiments, the case is in the form of a luggage tag, frame, book, light switch plate, or insert spot in an auto dashboard or other such case which has a surface suitable for receiving such a decoration.

The case can include a framing member extending around at least a portion of the periphery of the case, the framing member having a height substantially the same as or greater than the combined thickness of the fixation sheet member and the decorative sheet member.

The apparatus can further include a removal device (e.g., a suction device) configured to separate the decorative sheet from the fixation sheet. The suction device has a suction area substantially the same as the second region of the fourth side of the fixation sheet. The suction device may have a loop member configured for convenient attachment to a keychain, backpack, trouser loop or other convenient spot.

In a particular embodiment, the apparatus does not have a case and the first fixation sheet is applied directly to an outer surface of the article (e.g., a portable communications device, such as a phone, PDA, notebook, MP3 player, laptop computer, a luggage tag, frame, book, light switch plate, or insert spot in an auto dashboard or other articles having a surface suitable for receiving such a decoration).

In embodiments of this aspect of the invention, the decorative sheet is sized and configured to substantially cover the outer surface of the article. The decorative sheet is formed of a first material, the outer surface of the article is formed of a second material and the non-permanent adhesive adheres more strongly to the second material than to the first material. The article may be a portable communications device, such as a phone, PDA, notebook, MP3 player or laptop computer. In other embodiments, the article is a luggage tag, frame, book, light switch plate, or insert spot in an auto dashboard or other such case which has a surface suitable for receiving such a decoration.

Among other advantages, the fixation sheet has a first adhesive that firmly secures the fixation sheet to the article and a second adhesive, less permanent than the first adhesive, to allow the user to change the decorative sheet (e.g., switchable décor). Because second adhesive is less permanent than the first adhesive and the fixation sheet includes the adhesive and not the decorative sheet, the decorative sheet can be reused, easily stored, easily applied and switched for a different decorative sheet. The system provides a simple and fun way to decorate, change and personalize the look of the article. The look of the article can be changed without having to replace the entire case or the decal or skin that has adhesive applied directly to it.

Other features and advantages of the invention are apparent from the following description, and from the claims.

DESCRIPTION

Figure 1:
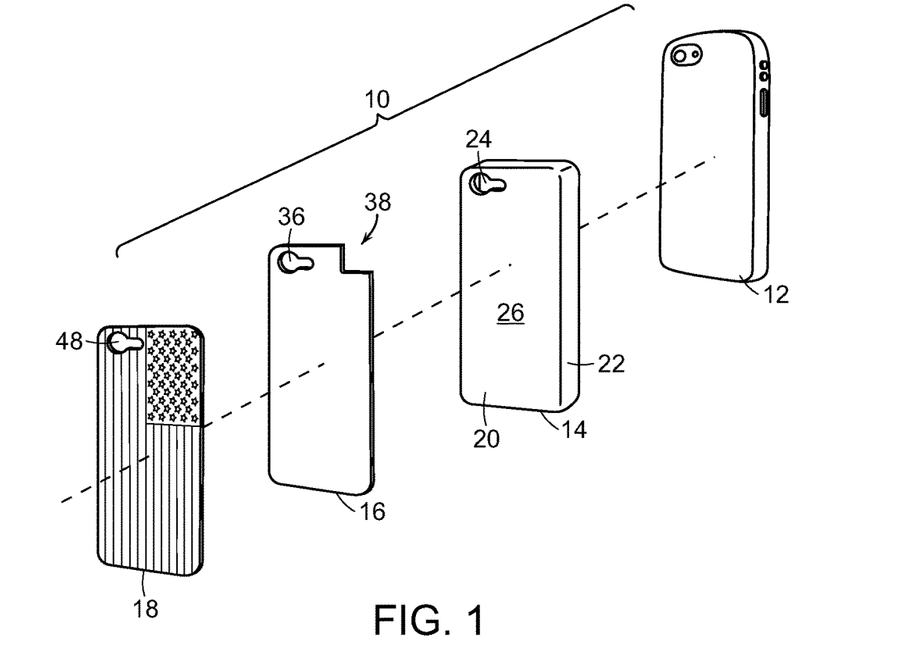
FIG. 1 is an exploded perspective view of a switchable décor used in conjunction with a smartphone.

Referring to FIG. 1, a system 10 for protecting and decorating a smartphone 12 includes a protective case 14, a fixation sheet 16 and a decorative covering, referred to here as a switchable décor 18. In this embodiment, the case 14 is formed of relatively rigid and molded plastic but could also be formed of metal or wood and is sized to receive smartphone 12. In particular, case 14 includes a backwall 20 and four side walls 22 which in aggregate form a shell that essentially encloses cell phone 14. Side walls 22 may include openings or cutouts to allow access to switches and connections for charging, headphones, etc. on smartphone 12. Member 20 also includes an opening 24 so as not to block or conceal the camera lens of the smartphone 12. As will be described in greater detail below, case 14 is sized and shaped to receive switchable décor 18. Furthermore, case 14 includes a rear surface that opposes the outer surface of smartphone 12 and when attached to the smartphone forms a cavity 49 (FIG. 5) that is used to store additional décors 18.

Figure 2:
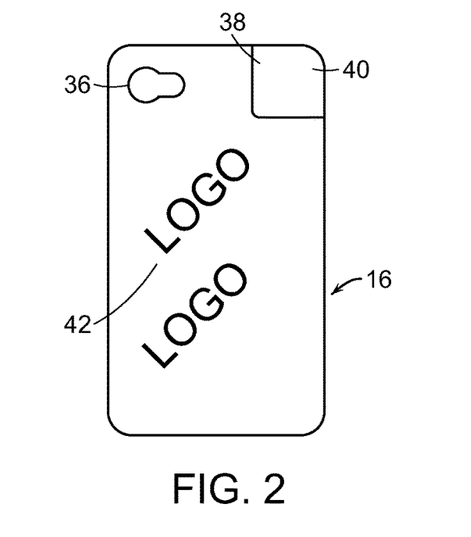
FIG. 2 is a plan view of the front face of the case of FIG. 1 including a fixation sheet.
Figure 3:
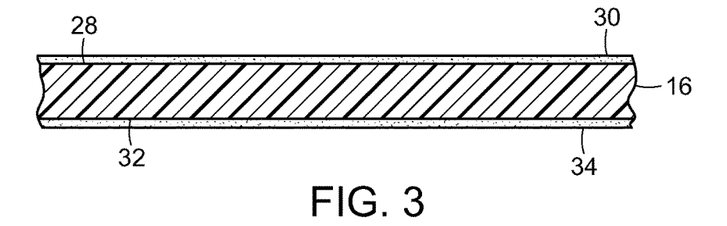
FIG. 3 is a cross-sectional view of the fixation sheet shown in FIG. 2.

Referring to FIGS. 2 and 3, system 10 includes a fixation sheet 16 formed of relatively thin (2-5 mils) plastic or paper and sized to attached to a front surface 26 of case 14. A rear surface 28 of fixation sheet 16 includes a relatively strong adhesive 30 so that when positioned on front surface 26 of case 14, fixation sheet is, for most practical circumstances, permanently affixed to case 14. One example of a suitable relatively permanent adhesive is Ref No. 204, manufactured by Polykote Corporation, Easton, Pa.

On the other hand, fixation sheet 16 includes on a front surface 32 a non-permanent adhesive 34 that is less strong than adhesive 30 used on rear surface 28. Fixation sheet 16 also includes an opening 36 sized commensurately with opening 24 of case 14. For reasons that will be discussed in greater detail below in conjunction with FIG. 6, fixation sheet also includes a cutout 38 such that a portion 40 of front surface 26 of case 14 is exposed and not covered with an adhesive. In this embodiment, the cutout 38 is provided so that exposed portion 40 of case 14 is in a corner of the case.

In this embodiment, non-permanent adhesive 34 is a microsphere adhesive composed of tiny spheres. The tiny spheres measure 10 to 250 microns in diameter and form a discontinuous film to limit the amount of surface area contact between the adhesive and front surface 32 of fixation sheet 16. One example of a suitable non-permanent adhesive is Ref. No. PS822, manufactured by Polykote Corporation, Easton, Pa.

Switchable décor 18 is formed of plastic and sized commensurately with fixation sheet 16. The thickness of switchable décor 18 is generally between 6 mil (0.006 inch) and 30 mil (0.030 inch), preferably 12-17 mil. Décor 18 also includes an opening 48 sized commensurately with openings 24, 36 of fixation sheet 16 and case 14, respectively. Unlike fixation sheet 16, switchable décor does not include an adhesive. Rather, switchable décor is securely attached to case 14 by non-permanent adhesive 34 on fixation sheet 16.

The adhesive characteristic or "stickiness" of non-permanent adhesive 34 is dependent on the materials it contacts. That is, non-permanent adhesive 34 may have a stronger adherence to one material than a different material. Therefore, depending on the particular non-permanent adhesive that is being used, the particular materials selected for making fixation sheet 16 and switchable décor 18 are generally selected such that the non-permanent adhesive will adhere more strongly to fixation sheet 16 and will adhere less to switchable décor 18. By selecting the appropriate non-permanent adhesive in conjunction with the materials for fixation sheet 16 and switchable décor 18, the switchable décor is more easily separated from fixation sheet 16 and the non-permanent adhesive more securely retained on the fixation sheet.

Switchable décor 18 includes a graphical image or design having black and white, color, text, names, patterns, images, photographs, or combinations of such designs. For example, the designs can include names, logos, slogans, advertisements or combinations of such graphical indicia. The designs may be customized by the user or be provided by the manufacturer of system 10. The design can be provided onto the substrate supporting the design by printing, silk screening, etching, etc. In certain embodiments. Switchable décor may have a luminescent effect (i.e., glow-in-the-dark), for example, as described in U.S. Pat. No. 6,875,525, which is incorporated in its entirety by reference.

Figure 4:
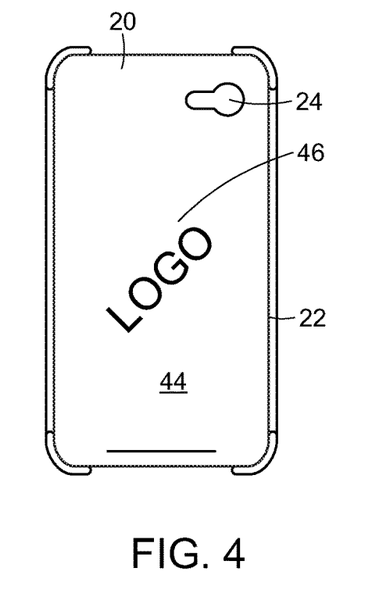
FIG. 4 is a plan view of the rear side of the case.

In this embodiment, fixation sheet 16 includes a graphic 42 (e.g., a corporate logo). Similarly, as shown in FIG. 4, a rear surface 44 of case 14 may also include a graphic 46 that is printed, embossed or etched thereon.

Figure 5:
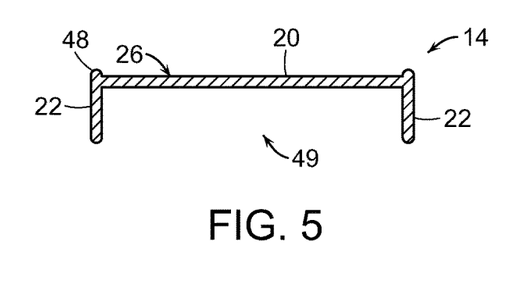
FIG. 5 is a cross-sectional end view along lines 3-3 of FIG. 4.

Referring to FIG. 5, front surface 26 of case 14 includes a lip or ridge 48 that extends around the periphery of backwall 20. Ridge 48 has a height the same or slightly larger than the combined thickness of décor 18 and fixture sheet 16 so that once attached to fixture sheet 16 the edge of switchable décor 18 is protected. In this way, the likelihood that the switchable décor 18 is inadvertently removed is minimized.

In using system 10, the user carefully attaches rear surface 28 of fixation sheet 16 to front surface 26 of case 14 such that non-permanent adhesive 34 on front surface 32 of the fixation sheet is exposed. The user can then attach switchable décor 18 to the non-permanent adhesive on the front surface 32 of fixation sheet 16. Once in place, switchable décor 18 is firmly secured to case 14.

Over time, the graphical image on switchable décor 18 may become worn or the user may desire replacing the décor for a different one. To do so, the user can remove the switchable décor 18 that is on case 14 and replace it with a different switchable décor (e.g., one that may be stored between smartphone 12 and case 14). Because the switchable décors do not include adhesive, they are easily exchanged and stored.

Figure 6:
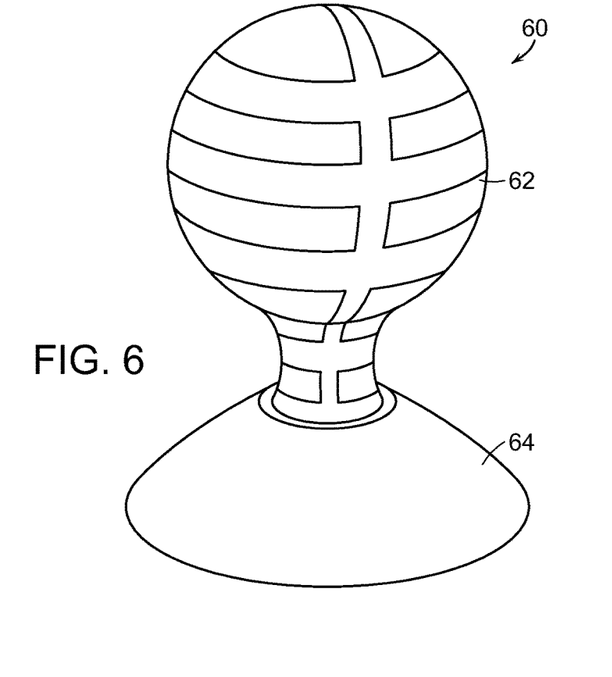
FIG. 6 is a perspective view of a suction tool for use in removing the switchable décor from the case.

Referring to FIG. 6, a suction tool 60 can be used to facilitate removal of switchable décor 18 from fixation sheet 16. In particular, the suction tool 60 includes a handle 62 attached to a suction cup 64 sized consistent with the size of cutout 38 of fixation sheet 16. Because there is no adhesive associated with cutout 38, the user applies suction cup 64 over and to that portion of switchable décor 18 over the cutout 38 of fixation sheet 16.

Figure 7:
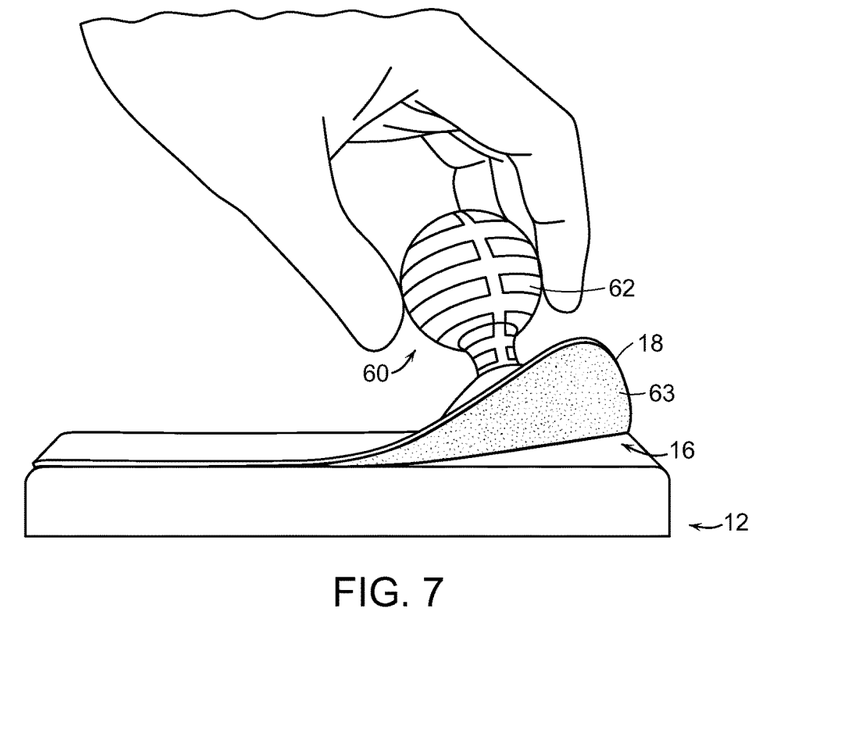
FIG. 7 illustrates the use of the suction tool of FIG. 6 in removing the switchable décor from the case.

Referring to FIG. 7, once suction tool 60 is attached to switchable décor 18 the user can pull on handle 62 to lift the edge of the décor. With an edge 63 of switchable décor 18 lifted, the user can grasp the switchable décor 18 and peel it from the fixation sheet having non-permanent adhesive 34.

In another embodiment, the case 14 may be eliminated and the fixation sheet 16 applied to directly to an outer surface of the article. For example, referring to FIG. 8, a system 100 includes fixation sheet 16 which is applied directly to an outer rear surface 102 of smartphone 12 as well as switchable décor 18. Switchable décor is attached and removed from fixation sheet 16 in the same manner described above in conjunction with FIGS. 1-6.

In still another embodiment, the fixation sheet 16 is eliminated and non-permanent adhesive 34 is applied directly to the outer surface of the case 14 or to any article including the smartphone 12 without a case. In this way, switchable décor 18 is attached directly to the case or the article. For example, the non-permanent adhesive can be applied directly to the outer rear surface by the manufacturer of the case and covered by a temporary sheet or switchable décor. In that case, the manufacturer would select an appropriate non-permanent adhesive that is suitable for use with the material of the case. For example, as described above, the material used to form case 14 and the particular non-permanent adhesive 34 are selected such that the adhesive adheres more strongly to the material of the case and adheres less strongly to the flexible décor.

It is to be understood that the foregoing description is intended to illustrate and not to limit the scope of the invention, which is defined by the scope of the appended claims.

For example, although non-permanent adhesive 34 is described as being in the form of microspheres, other non-permanent adhesives can be used. Other examples of non-permanent adhesives include removable pressure sensitive adhesives as well as repositionable adhesives. Furthermore, other non-adhesive mechanisms (e.g., magnetic or static) can be substituted for non-permanent adhesive 34.

Also, although a system 10 including a fixation sheet and switchable décor was described above in conjunction with a smartphone it is appreciated that the system can be used with a wide variety of other articles including portable electronic devices (cell phones, laptop computers, tablets, MP3 players and similar devices) as well as other articles such as a luggage tag, light switch plate, frames, books or insert spot in an auto dashboard or the like.

In the embodiments described above in conjunction with FIGS. 1-8, a general approach for allowing a user to change the decorative sheet (e.g., switchable décor 18) was described. This approach relied upon the use of a fixation sheet having a first adhesive that firmly secured the fixation sheet to the article and a second adhesive, less permanent than the first adhesive, to allow the user to change the decorative sheet (e.g., switchable décor ). This concept can be extended to the decorative sheet itself.

Figure 9:
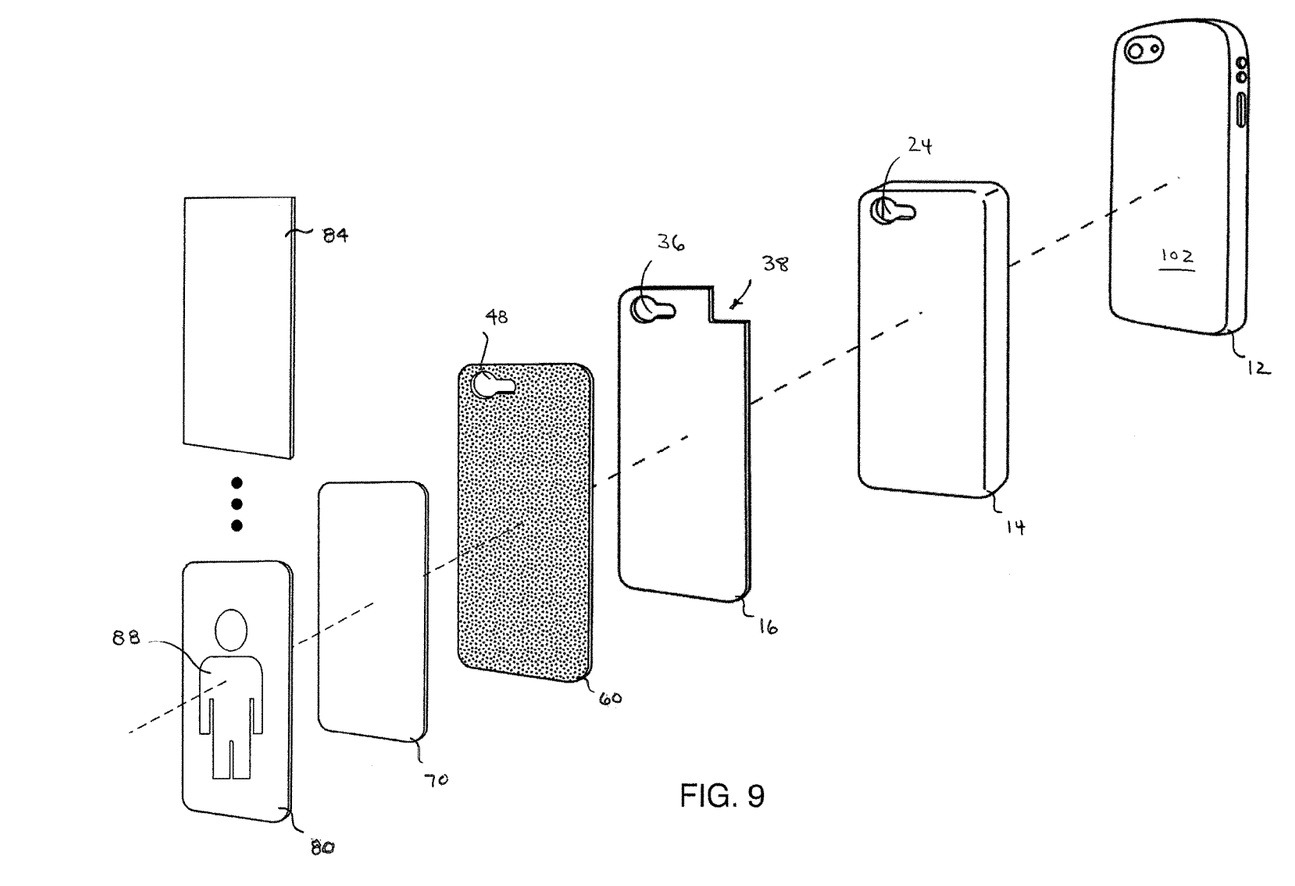
FIG. 9 is an exploded perspective view of another alternative of a switchable décor used in conjunction with a smartphone.

For example, as shown in FIG. 9, a second fixation sheet 70 can be affixed to an exposed outer surface of switchable décor 60 so that yet another and different object can be easily attached or applied to the smartphone or article. Although the object can be of a variety of sizes and shapes, in applications where the article is a smartphone the object is generally planar and flat to allow the smartphone to be easily stored (e.g., placed in a pocket). The object preferably would have the same or at least a similar footprint as the second fixation sheet 70.

In some embodiments, the footprint of the second fixation sheet occupies only a portion of the outer surface of the switchable décor 18. That way, the second fixation sheet 70 and attachable object can be framed or surrounded by the pattern of the switchable décor 18.

As was the case with fixation sheet 18, second fixation sheet 70 includes a non-permanent adhesive agent (i.e., a bonding agent) on a front surface that is less strong than an adhesive or other bonding agent that is used on rear surface. Like fixation sheet 16, fixation sheet 70 would also include an opening 72 sized commensurately with opening 24 of case 14. Furthermore, fixation sheet 70 might also include a cutout (not shown) such that a portion of front surface of the switchable décor 18 is exposed and not covered with an adhesive.

Prior to applying the object on the second fixation sheet 70, a protective liner 84 can cover the front surface of the second fixation sheet and the non-permanent adhesive agent.

In this embodiment, the object is a photograph 8. The use of a second fixation sheet on a switchable décor is particularly attractive and advantageous in an application in which the object is a personal item such as a printed image or a photograph 80 having an image 88. That is, the user can produce relatively two-dimensional items to be attached as a switchable décor with the second fixation sheet 70 acting as the mounting surface.

Figure 8:
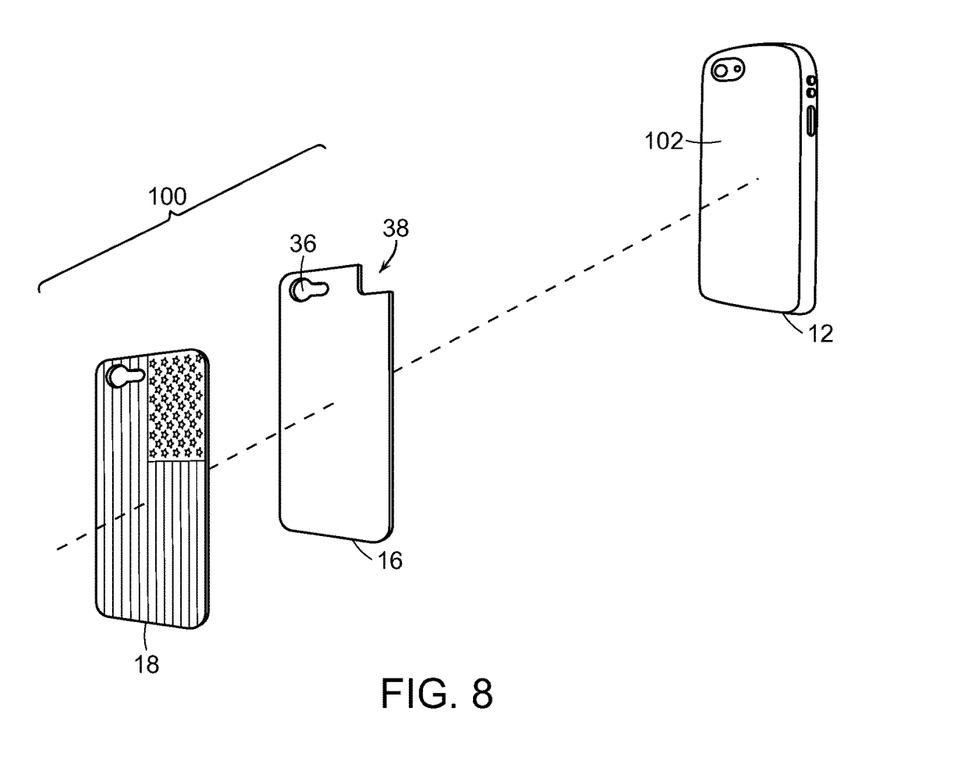
FIG. 8 is an alternative embodiment of a system having a switchable décor used in conjunction with a smartphone.
Figure 10:
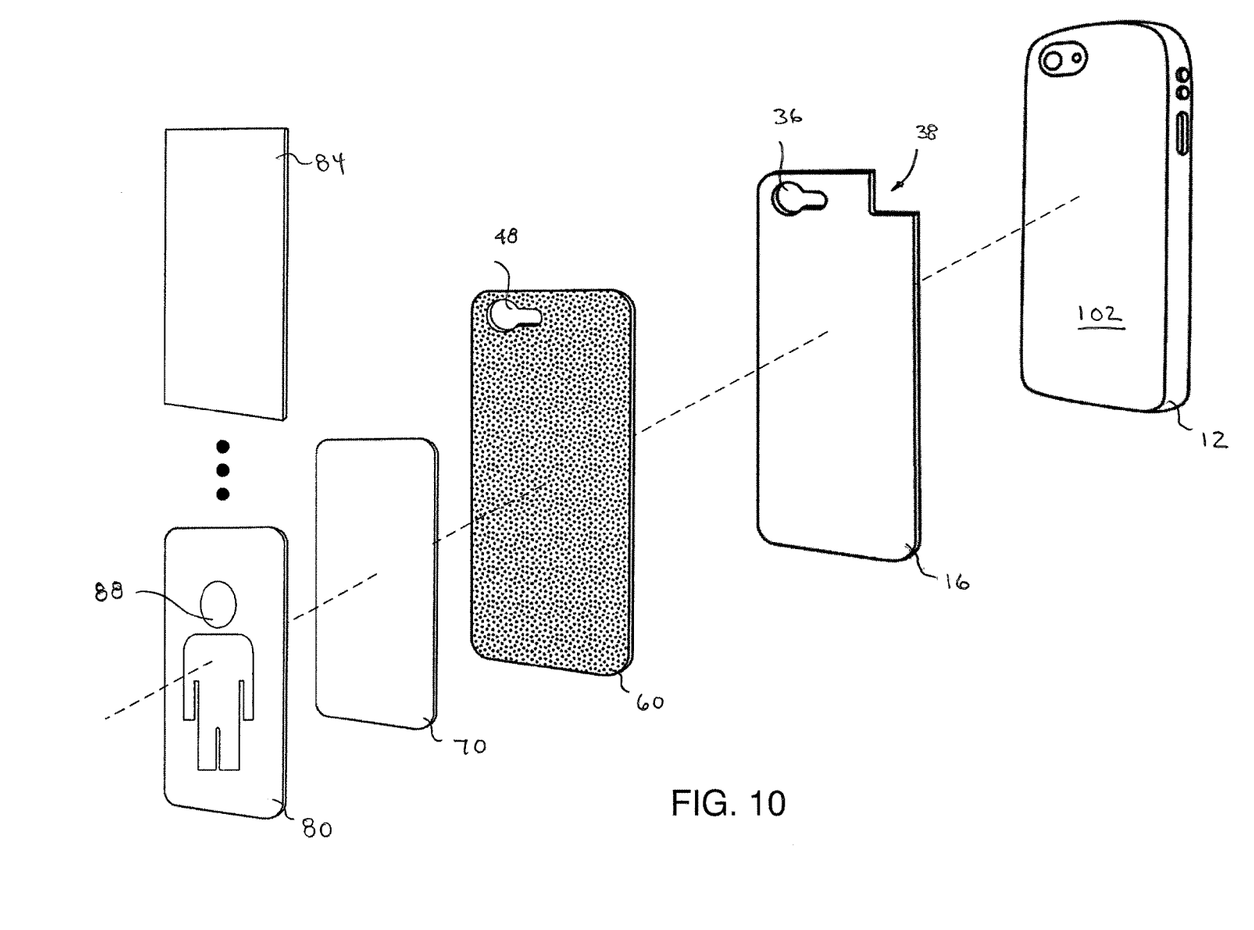
FIG. 10 is an exploded perspective view of yet another alternative of a switchable décor used in conjunction with a smartphone.

Referring to FIG. 10, similar to the embodiment shown in FIG. 8, the case 14 may be eliminated and the fixation sheet 16 applied to directly to an outer surface of the article. For example, referring to FIG. 10, fixation sheet 16 is applied directly to an outer rear surface 102 of smartphone 12 as well as switchable décor 60. Switchable décor is attached and removed from fixation sheet 16 in the same manner described above in conjunction with FIG. 1.

Figure 11:
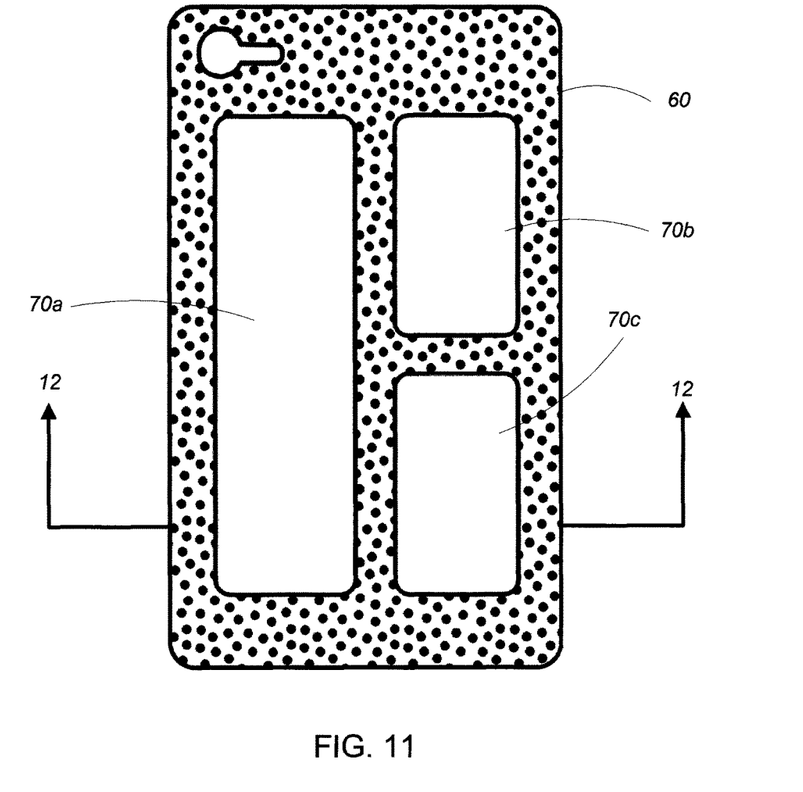
FIG. 11 is a top view of an alternative embodiment of a second fixation sheet.
Figure 12:
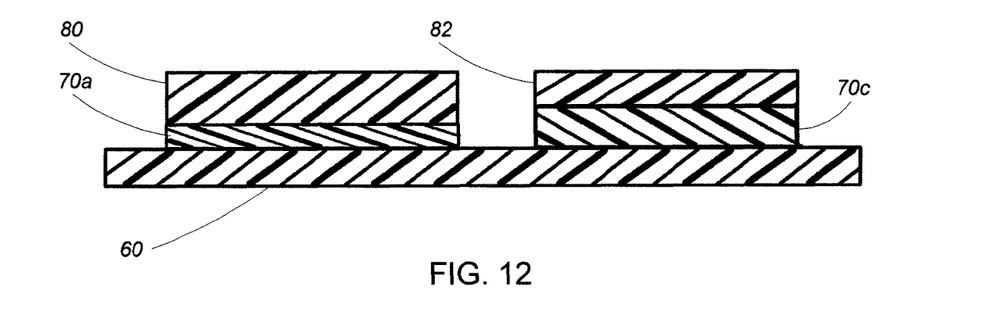
FIG. 12 is a cross-sectional side view of the second fixation sheet of FIG. 11 with articles attached thereto.

Referring to FIGS. 11 and 12, a fixation sheet might also be composed of a plurality of fixation pieces 70a, 70b, 70c at different positions on switchable décor 18. The different fixation pieces 70a, 70b, 70c might have different adhesive agents with different adhesive characteristics for supporting different types of objects. Or, as shown in FIG. 12, the thickness of one fixation piece 70a might be different than a neighboring fixation piece 70c, for example, such that the overall thickness of a fixation piece 70c and its associated object 82 is the same or similar to the overall thickness of a neighboring, perhaps thicker, fixation piece 70a that supports a thinner but heavier object 80 (here a photograph). Thus, the objects attached to the fixation sheet are substantially uniform, thereby allowing the article (e.g., smartphone) to be stowed in a pocket.

Furthermore, as described above in conjunction with FIGS. 1-8, the non-permanent adhesive might be a microsphere adhesive composed of tiny spheres or a different material with adhesive properties (e.g., silicon).

In a particular embodiment, the photograph 80 can be produced using an instant camera of the type which uses self-developing film to create a chemically developed print shortly after taking the picture. One example of such a system is the Instax® brand of instant still camera marketed by Fujifilm®. For this embodiment, the Instax® "mini" format (62 mm×46 mm) is dimensionally well-suited for being applied to switchable décor 60 having a fixation sheet 70 generally smaller than fixation sheet 16, which is used to attach switchable décor 60 to case 14. In this embodiment in particular, fixation sheet 70 is sized and shaped consistent with the dimensions of the Instax mini-format photograph. The photograph could also be generated by other camera systems including those provided by Polaroid, Fuji, HP Sprocket and other Instant photo systems like printers.

Of course, objects could be substituted for a photograph including objects made of materials including plastics, leather, fur, wood, and fabric.

Other embodiments are within the scope of the following claims.

What is claimed is:

1. An apparatus comprising:
   a case for receiving a removable article, the case having an outer surface;
   a first fixation sheet member having:
      a first side and a second side opposite the first side, the first side configured to be attached to the outer surface of the case, the first side including a first permanent bonding agent with a first adhesion characteristic, the second side having a first repositionable material with a second adhesion characteristic the second adhesion characteristic being less permanent than the first adhesion characteristic;
   a decorative sheet member having:
      a third side and a fourth side opposite the third side, the third side configured to be attached to the second side of the first fixation sheet; and
   a second fixation sheet member having:
      a fifth side and a sixth side opposite the fifth side, the fifth side configured to be attached to the fourth side of the decorative sheet member, the fifth side including a second bonding agent with a third adhesion characteristic; the sixth side having a second repositionable material with a fourth adhesion characteristic, the fourth adhesion characteristic being less permanent than the first and third adhesion characteristics.

2. The apparatus of claim 1 wherein the first repositionable material and second repositionable material are adhesives.

3. The apparatus of claim 2 wherein the adhesive include microspheres.

4. The apparatus of claim 1 wherein the first repositionalve material and second repostionable material are non-adhesives.

5. The apparatus of claim 4 wherein the non-adhesives are in the form of a mechanism selected from the group consisting of static and magnetic mechanisms.

6. The apparatus of claim 1 further comprising an attachable member having a seventh side and an eighth side opposite the seventh side, the seventh side configured to be attached to the sixth side of the second fixation member.

7. The apparatus of claim 6 wherein the attachable member and the second fixation sheet are configured such that when the attachable member is removed from the sixth side of the second fixation sheet, the repositionable material remains on the sixth side of the second fixation sheet.

8. The apparatus of claim 6 wherein the attachable member sheet is formed of a first material, the second fixation sheet is formed of a second material and the repositionable material adheres more strongly to the second material than to the first material.

9. The apparatus of claim 6 wherein the eighth side of the attachable member includes a photographic, graphical or textual image.

10. The apparatus of claim 9 wherein the attachable member is a photograph.

11. The apparatus of claim 6 wherein the attachable member has a thickness a range between 6 mil (0.006 inch) and 30 mil (0.030 inch).

12. The apparatus of claim 6 wherein the attachable member includes a pocket.

13. The apparatus of claim 1 wherein the first and second bonding agents are the same.

14. The apparatus of claim 1 wherein the first adhesion characteristic and the third adhesion characteristic are the same.

15. The apparatus of claim 1 wherein the first and second repositionable materials are the same.

16. The apparatus of claim 1 wherein the second adhesion characteristic and the fourth adhesion characteristic are the same.

17. The apparatus of claim 1 wherein the second fixation sheet includes a plurality of fixation pieces, each fixation piece including the second bonding agent and repositionable material.

18. The apparatus of claim 17 further comprising a plurality of attachable members, each corresponding to one of the plurality of fixation pieces.

19. The apparatus of claim 17 wherein one of the plurality of fixation pieces has a first thickness and another of the plurality of fixation pieces has a second thickness different than the first thickness.

20. The apparatus of claim 19 wherein one of the plurality of attachment members has a third thickness and another of the plurality of attachment members has a fourth thickness different than the third thickness; and wherein the sum of the first and third thickness is substantially the same as the thickness of the second and fourth thickness.

* * * * *